Sept. 3, 1935.  W. I. GLADFELTER  2,013,144
BOTTLE HANDLING MACHINE AND CONTROL THEREFOR
Filed July 29, 1932  6 Sheets-Sheet 1

Inventor
Willie I. Gladfelter
By Cushman, Bryant, Darby & Cushman
Attorneys

Sept. 3, 1935. W. I. GLADFELTER 2,013,144
BOTTLE HANDLING MACHINE AND CONTROL THEREFOR
Filed July 29, 1932 6 Sheets-Sheet 3

Inventor
Wittie I. Gladfelter.
By Cushman Byant Darby & Cushman
Attorneys

Sept. 3, 1935.    W. I. GLADFELTER    2,013,144
BOTTLE HANDLING MACHINE AND CONTROL THEREFOR
Filed July 29, 1932    6 Sheets-Sheet 4
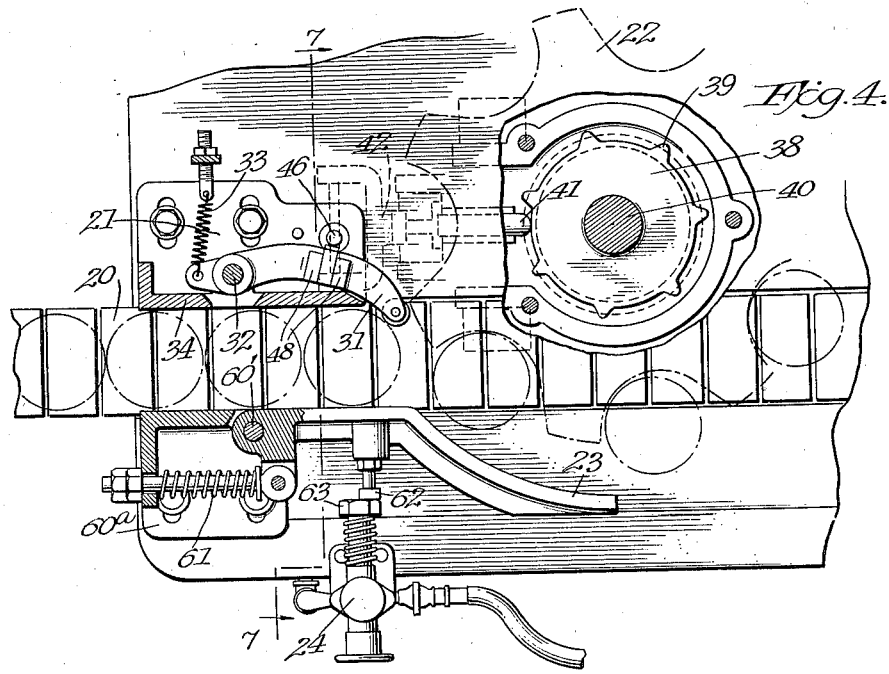
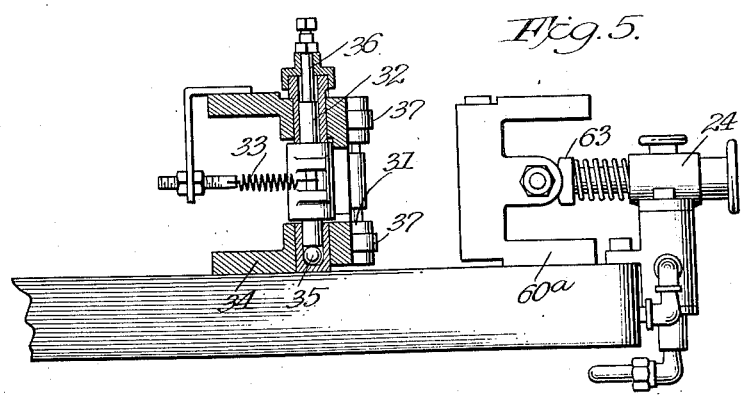
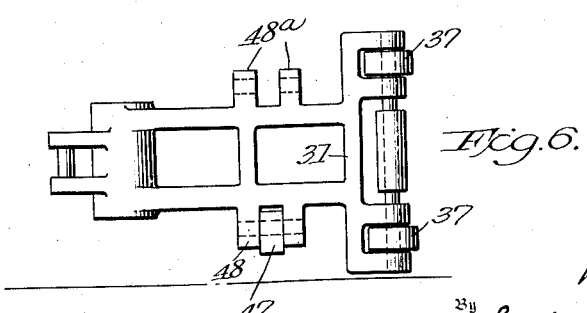

Sept. 3, 1935. W. I. GLADFELTER 2,013,144
BOTTLE HANDLING MACHINE AND CONTROL THEREFOR
Filed July 29, 1932 6 Sheets-Sheet 5
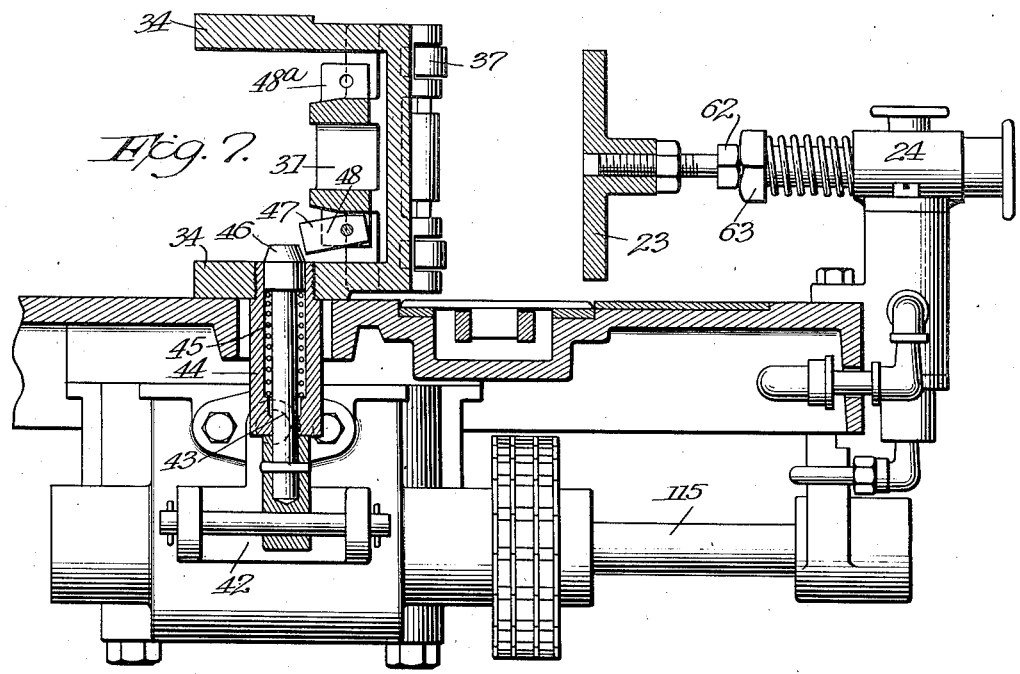
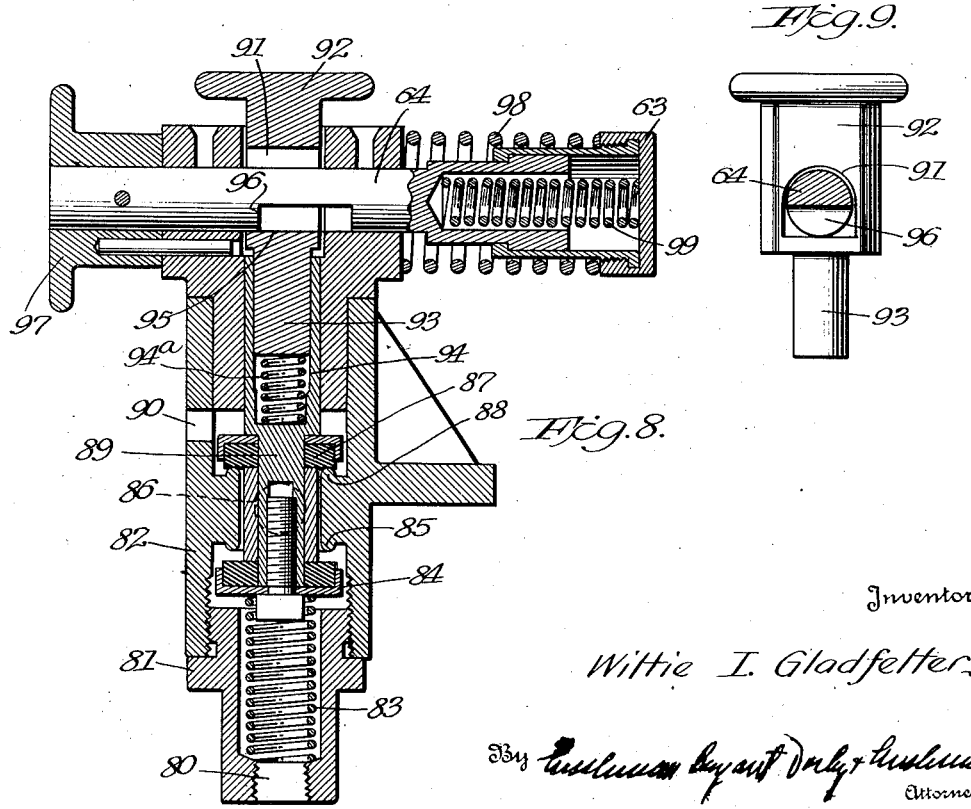
Inventor
Wittie I. Gladfelter
Attorneys

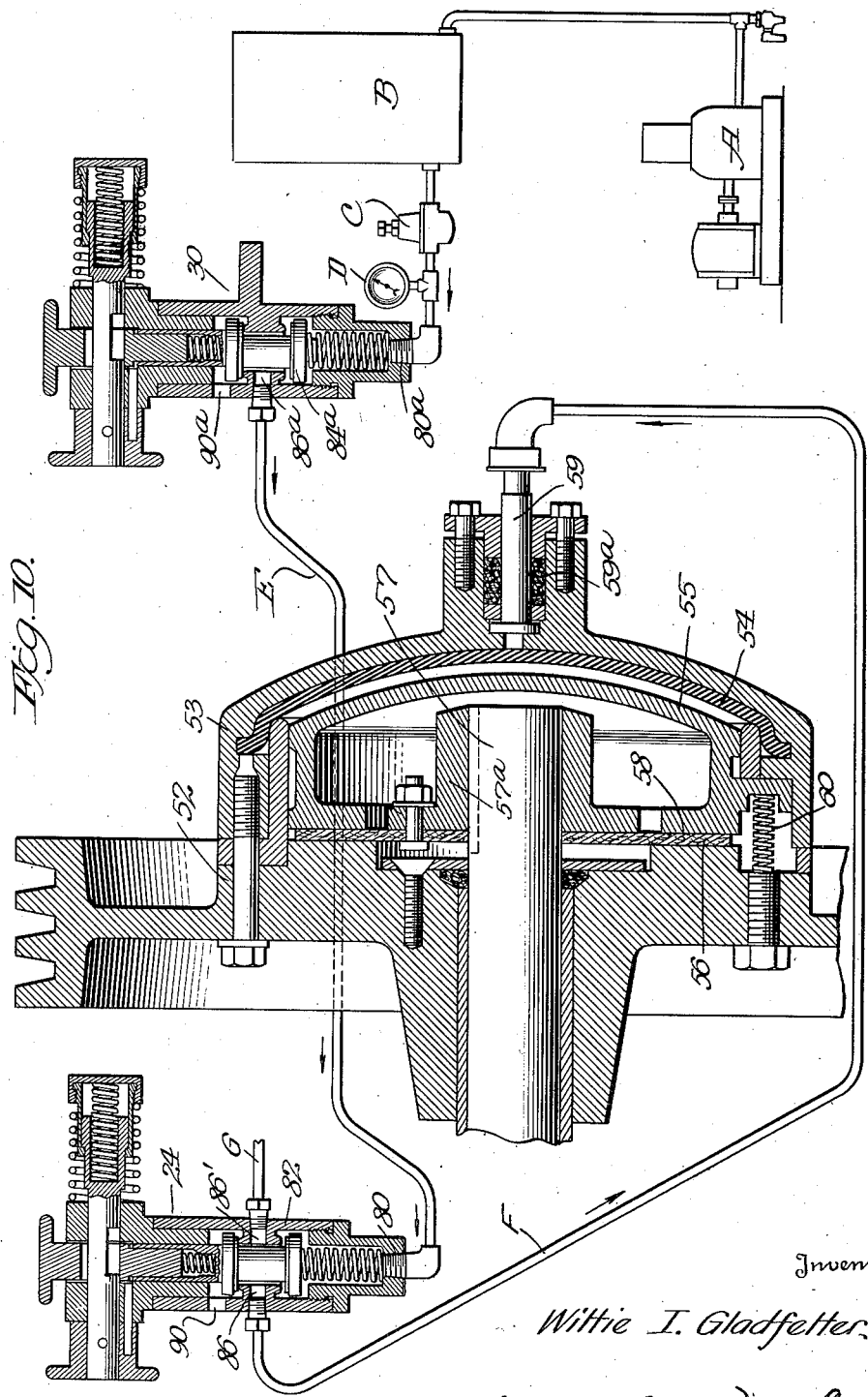

Patented Sept. 3, 1935

2,013,144

UNITED STATES PATENT OFFICE 2,013,144

BOTTLE HANDLING MACHINE AND CONTROL THEREFOR

Wiltie I. Gladfelter, Baltimore, Md., assignor to Crown Cork & Seal Company, Inc., Baltimore, Md., a corporation of New York Application July 29, 1932, Serial No. 626,151

13 Claims. (Cl. 198—22)

This invention relates to a new and improved machine for handling and treating bottles. More particularly, it relates to a machine for applying closures of the crown cap type to a previously filled bottle, although many features of the machine may be readily applied to a machine adapted to fill bottles, or to a machine adapted to both fill and cap bottles. It will be apparent, therefore, that, although the specific embodiment of the invention shown in the accompanying drawings and described in the specification is applied to a bottle capping machine, the invention is not limited thereto, but may be readily used with other types of machines.

It is a primary object of the present invention to provide new and advantageous means for handling bottles in the machine. More particularly, it is an object of the invention to provide novel means for controlling and timing the delivery or transfer of bottles from a conveyor to the infeed end of the machine. This means comprises a gate or other bottle arresting member associated with the conveyor and arranged to release individual bottles for transfer from the conveyor to a bottle receiving member at the infeed end of the machine only when said member is in proper position to receive a bottle.

It is a further object of the present invention to provide a safety device which will function to stop the machine whenever an improperly or abnormally positioned bottle is either fed to the machine or discharged therefrom.

It is a further object of the invention to drive the machine through the medium of an air pressure actuated clutch and to control the action of said clutch, to start or stop the machine by means of specially constructed air control valves. An important advantage of the invention resides in the fact that the action of the air control valves may be in turn controlled by the aforementioned safety devices, so that an improperly positioned bottle will function to actuate the air valve to release the clutch and stop the machine.

Another advantageous feature of the invention resides in the manner in which the several parts of the bottle infeed timing mechanism and of the machine control mechanisms are formed to enable the machine to be altered from a right-hand to a left-hand feed, or vice versa. In many bottling plants, the arrangement of the various machines in the particular floor space available makes it essential that a particular machine, in order to cooperate with other machines previously located, be constructed to receive bottles at say the left-hand and deliver from the right-hand end, while in other plants an opposite feed is needed. As a consequence it is usually necessary to construct two different models of each machine produced, one a left-hand feed and the other a right-hand feed. Necessarily, this dual production greatly increases the expense of making the machine, and increases the cost to the consumer. In the machine of the present invention, all of the parts are made, so that they may be turned over and used at opposite ends of the machine. Consequently, it is necessary in building the present machine to make only one set of parts, and then to assemble them in a particular way to make either a right-hand or a left-hand feed machine.

It is a further object of the present invention to provide a machine which may be readily changed over from operation on one size bottle to operation on another size bottle.

In the accompanying drawings, a specific embodiment of the machine of the present invention is illustrated. It is to be understood that the machine disclosed in the drawings and described below is an illustrative embodiment only, and the scope of the invention is not confined to the details thereof except as specifically limited in the appended claims.

In the drawings:

Figure 4 is an enlarged plan view of the bottle feed control means of my invention, certain parts being broken away for the sake of clearness.

Figure 5 is an elevational view taken from the left end of Figure 4, certain parts being shown in section.

Figure 6 is a detailed elevational view of the bottle arresting gate of my invention.

Figure 7 is a vertical sectional view taken on line 7—7 of Figure 4.

Figure 8 is a longitudinal sectional view of my air control valve.

Figure 9 shows a detail of the same.

Figure 10 is a diagrammatic illustration of the air control system of my invention, and shows the cycle of air flow.

Figure 1:
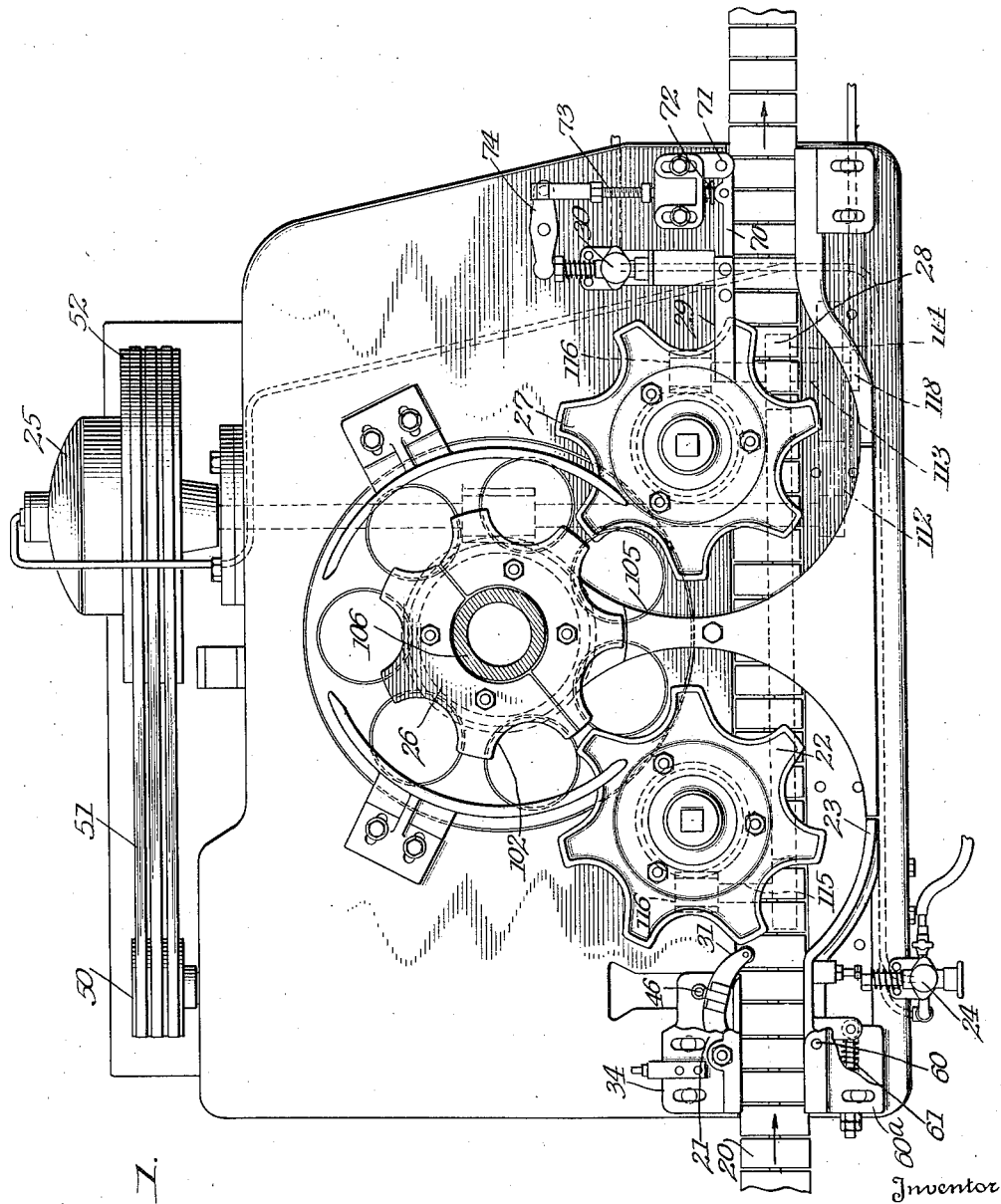
Figure 1 is a top plan view of the machine with the bottling capping head removed.

Referring to Figure 1 of the drawings, it will be noted that bottles to be capped are carried along on an endless conveyor 20 past an infeed bottle timing device represented generally by reference character 21 to an infeed spider 22. Opposite the spider, there is disposed a movable guard member 23 which is adapted to actuate an air control valve assembly 24, in case an improperly positioned bottle is received by the spider. Thus, if a bottle, from any cause, should become tipped over, the spider would force the same into contact with the guard 23 which, in turn, would actuate the valve of the assembly 24 to cut off the supply of actuating air to the air clutch 25 and stop the machine, all as will be particularly described below.

From the infeed spider 22, bottles are transferred to a capping head spider 26, where they are carried around, capped, and conveyed to the discharge spider 27.

This discharge spider conveys the capped bottles to the discharge end 28 of the conveyor 20, by which instrumentality the bottles are carried to a labeling machine or the like.

Associated with the conveyor at a point adjacent the discharge end of the machine, is another movable guard 29 connected through a suitable link and lever system with a second air control valve assembly 30. This assembly is arranged to also cut off the supply of air pressure delivered to the clutch 25 to stop the machine, and the valve is actuated by an improperly positioned bottle being discharged from the machine by the discharge spider 27. Thus, if a bottle should become tipped over prior to its discharge from the machine, the machine will be stopped, so that the bottle may be removed before it is conveyed to the labeling machine or the like. Also in case the outfeed conveyor should be jammed due to the labeler being stopped, or from any other cause, the guard 29 will be actuated.

The bottle infeed timing device 21 includes a gate member 31 adapted to hold back the incoming bottles and to allow them to pass through one by one in timed relation with the infeed spider 22. Gate 31 is pivotally mounted on pin 32 (Figs. 4 and 5) for swinging movement toward and from the conveyor 20. An adjustably mounted spring 33 is secured to one end of the gate, and constantly tends to swing the gate over the conveyor into bottle arresting position. The tension of the spring is light, so that the gate may be deflected from bottle arresting position by contact with a bottle travelling on the conveyor without displacing the bottle.

The vertical pin 32 upon which the gate is mounted is journalled in upper and lower substantially horizontal flanges of a supporting bracket 34. The pin is supported from below by a ball 35 and its upward movement is limited by an adjusting bolt 36, so that the pin swings easily about its axis, but has substantially no endwise movement.

The gate member 31 has an outwardly projecting end overlying the conveyor 20 provided with bottle contacting rollers 37. These rollers are interchangeable and different sizes may be substituted to accommodate differently sized and shaped bottles.

From the above, it will be apparent that bottles travelling on the conveyor 20 are capable of deflecting the gate member 31 from bottle arresting position by swinging the same about the axis of pivot pin 32. Means are provided to prevent this deflection of the bottle arresting member at all times, except when the infeed spider 22 is in proper position to receive a bottle. This means comprises a vertically reciprocable abutment plunger adapted to lie in the path of swinging movement of the gate to prevent deflection thereof, in combination with means for withdrawing the abutment plunger in predetermined timed relation to the receiving spider.

In the specific embodiment illustrated, the abutment plunger is actuated by a mechanism connected to and actuated by the shaft upon which the infeed spider is secured. As shown, a cam 38 having projections 39 is fixed to the vertical shaft 40, which carries the spider 22. A horizontally reciprocable cam follower 41 is appropriately mounted in the side of the casing enclosing the various driving shafts of the machine and has an end projecting outwardly therefrom. A bell crank lever 42 is pivotally mounted on the casing and has an upstanding arm contacting with the end of the cam follower 41. The other arm of the bell crank is pivotally connected to a vertically disposed abutment plunger 43. This plunger is mounted to reciprocate in a sleeve 44 against the action of a spring 45 and has an upper head 46 projecting upwardly through the lower horizontal flange of the bracket 34. (See Fig. 7)

It will be seen that the head 46 of the abutment plunger, when in its upwardly projected position, is disposed in the path of swinging movement of the gate 31, so that the gate cannot be deflected by a bottle on the conveyor until the head 46 has been withdrawn from its upwardly projected position. I preferably provide the gate 31 with a specially constructed abutment member to contact the head 46. In the embodiment illustrated, this member takes the form of a pivoted dog 47 mounted on a suitable pin between a pair of lugs 48 formed integrally with the gate. The function of the pivoted dog will be described below.

Figure 2:
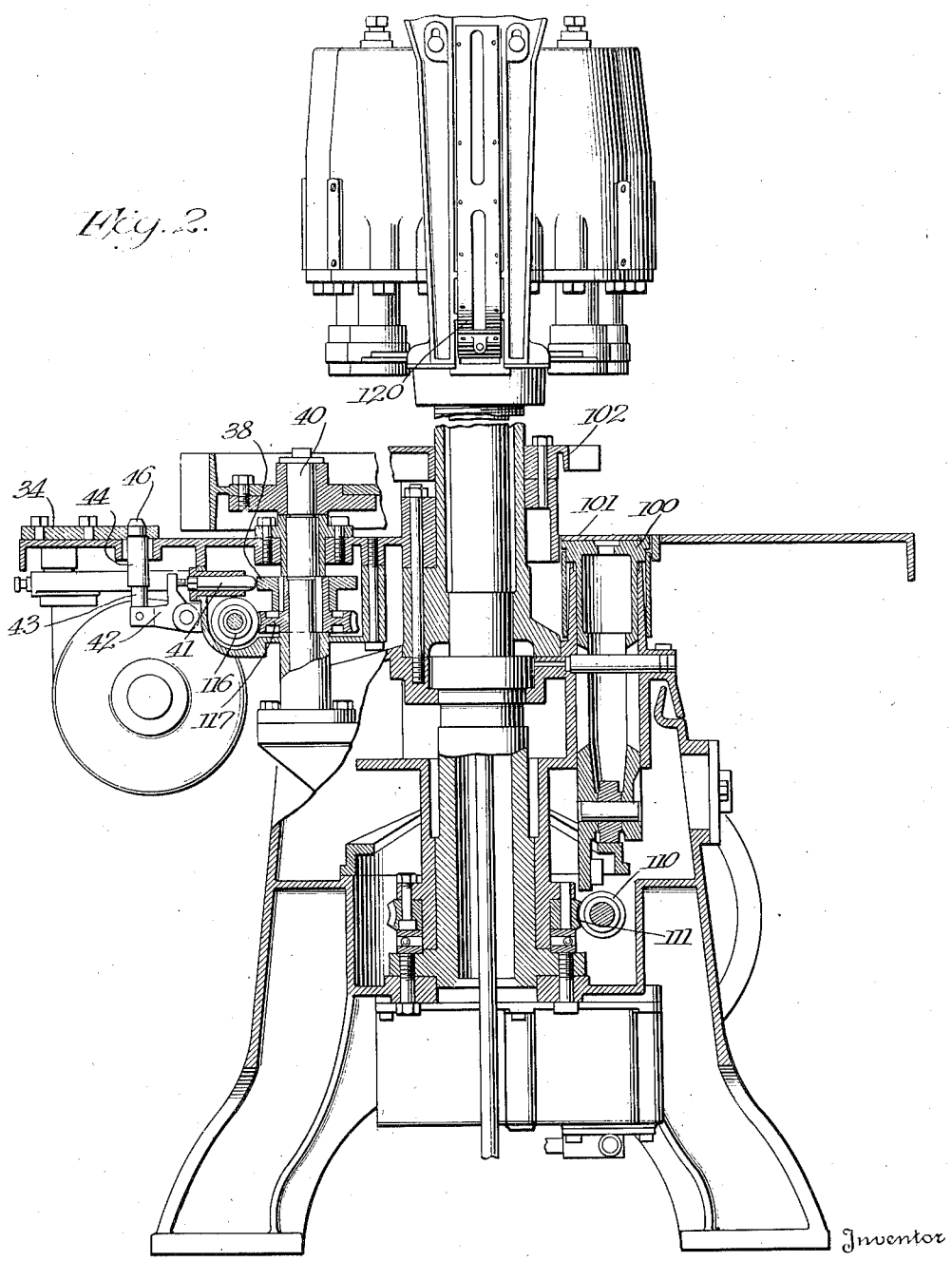
Figure 2 is a vertical longitudinal sectional view looking toward the rear, taken on planes parallel to the front of the machine of Figure 1, showing certain parts in section, and other parts in elevation.

The operation of the bottle infeed timing mechanism will be apparent from a consideration of the above description, in connection with the accompanying drawings. As the machine operates, a projection 39 on the cam 38 moves the cam follower in a left-hand direction (Figs. 2 and 4), which movement rocks the bell crank 42 and depresses the abutment plunger 43 and head 46 against the action of the spring 45. When in its depressed position, the head 46 is out of abutting relation to the dog 47 and a bottle on the conveyor 20 will deflect the gate 31 from bottle arresting position against the light tension of spring 33. Thus, a bottle is permitted to pass the gate 31 to be received by one of the pockets of the spider 22. Because of the relative spacing of the cam projections 39 to the pockets of the spider, the abutment plunger 43 will be withdrawn and the gate deflected by a bottle only when a pocket in the spider is in proper position to receive a bottle.

From a consideration of the configuration of the cam projections 39, it will be apparent that the abutment plunger will be withdrawn only long enough for a single bottle to pass the gate 31, after which event, the gate will be swung back to normal position by the light spring 33, and will be held in that position until the plunger 43 is again withdrawn.

In case a bottle is a fraction of a second late and contacts the gate after the plunger has been withdrawn and holds the gate in deflected position slightly longer than usual so that the head 46 is projected upwardly before the gate has been returned to bottle arresting position overlying the conveyor, the pivoted dog 47 will swing upwardly by reason of this upward movement of the head 46, and as soon as the bottle has passed the gate will swing back away from the plunger and the dog will drop into normal position. Thus, the pivoted dog functions to prevent a jamming of the plunger head 46 with the abutment surface of the gate in case the latter does not swing out of the path of the plunger prior to its return to upwardly projected position. It will be apparent that if this pivoted connection, or its equivalent, were not provided, the plunger head might be projected upwardly before the gate returned to normal position out of its path, and consequently some of the parts of the machine would be broken or the gate would be held in deflected position by frictional contact with the plunger, or the gate would be projected with great force back to bottle arresting position over the conveyor. Either of these results would be highly undesirable, and the pivoted dog construction entirely obviates them.

The bottle infeed timing device just described is extremely efficient in operation and results in an accurate and smooth transfer of bottles from the conveyor to the machine. It has been successfully used in bottle capping machines, and has controlled the feed of bottles to a machine operating upon as many as 140 bottles per minute with entire satisfaction.

In high speed machines of the present type, it is desirable to provide certain safety devices to automatically stop the machine, in case a bottle, for one reason or another, is abnormally or improperly positioned. Thus, breakage of bottles is prevented. The automatic control disclosed in the present machine is an important feature of the invention, and it will now be described.

Any suitable prime mover such as an electric motor or the like delivers power to a pulley 50, which, through the medium of belts 51, drives a second pulley 52 constituting the driving member of an air pressure actuated clutch indicated generally at 25. Although the specific structure of this clutch is not a part of the invention of the present application, its construction will be described in sufficient detail to render its operation clear to one skilled in the art. Secured to the hub of the pulley 52 is a cylinder 53 having a diaphragm 54 clamped adjacent its periphery. A piston 55 is mounted for axial movement in the cylinder 53 and for rotation therewith. A hub or collar 57a is rigidly fastened to shaft 57, upon which is secured a fiber disc 56 radially disposed between the hub face of the pulley 52 and the inner radial face 58 of the piston.

When air under pressure is admitted to the clutch behind the diaphragm 54 through the air conduit 59, and stuffing box 59a, the diaphragm moves to the left (Fig. 3), forces the piston 55 in that direction, and clamps the fibre clutch plate 56 between the hub of the pulley and the radial face 58 of the piston. Thus, a driving connection is established from the hub and piston, through the clutch plate, to shaft 57 to drive the latter.

A plurality of compression springs 60 are disposed between the piston and the pulley hub and these springs constantly tend to urge the piston to disengaged position. Thus, as soon as the air pressure on the right side of the diaphragm 54 is relieved, the springs disengage the clutch and no driving force is imparted to the machine.

In accordance with the present invention manual and automatic means are both provided for controlling the flow of air under pressure to the clutch. Considering first the automatic means adapted to be actuated by an improperly positioned bottle entering the machine, it will be noted that a pivoted guard 23 is located opposite the infeed spider 22. This guard has an arcuate section spaced from the periphery of the infeed spider and a straight section lying along the conveyor. The guard is pivoted at 60' for swinging movement away from the spider against the action of a spring 61. Between its ends, the guard is provided with an adjustable abutment bolt 62 which is normally in contact with a cap 63 connected to a spring-pressed latch bolt 64 (Fig. 8). The latter is a part of the air control valve assembly of my invention and functions to hold the valve in open or operative position. When the guard swings away from the spider, movement is transmitted to the latch bolt, and as a consequence the air valve is permitted to close to stop the machine.

A similar arrangement of automatic valve actuating means is positioned adjacent the discharge end of the machine so that, should a bottle be discharged from the machine in an abnormal position, or in case the discharge conveyor is jammed full, the machine will be stopped before the bottle is carried away to some other machine in the plant. This means comprises a movable guard 70 pivoted at 71 and provided with an abutment pin 72 (Fig. 1). Movement is transmitted through the adjustable rod 73 to a lever 74 and thence to the valve 30. This valve also functions to cut off the supply of air to the clutch to stop the machine.

Considering now the specific form of air control valve disclosed in Figure 8 of the drawings, it will be noted that air from any suitable source is conveyed under pressure to an axially bored port 80 in cap 81 on the lower end of the valve housing 82. A relatively strong compression spring 83 is disposed in an internal enlargement in the cap 81 and the upper end of the spring is in contact with a cut-off valve 84 constantly tending to urge the same upwardly to closed position on seat 85. When the machine is in operation air flows in the port 80 upwardly past the valve 84, past the seat 85 and out of the lateral port 86 disposed in the side of the housing, and from there through conduits to the clutch, as described below.

It will be noted that a second valve 87 and seat 88 is disposed above the outlet port 86, but that this valve is closed when the assembly is in operative position, as disclosed in Figure 8. When the main valve stem 89 which carries both valves moves upwardly, the valve 84 is closed and the supply of air under pressure is cut off. At the same time, the valve 87 is lifted from seat 88 and air under pressure in the clutch is permitted to flow backwardly through the conduits and through the port 86 past the valve 87 to exhaust to atmosphere through the lateral opening 90 thereabove. Thus, the valve assembly of the present invention not only cuts off the supply of air under pressure to the clutch, but also permits the exhaust of air under pressure in the clutch, so that the clutch will be immediately disengaged.

Figure 3:
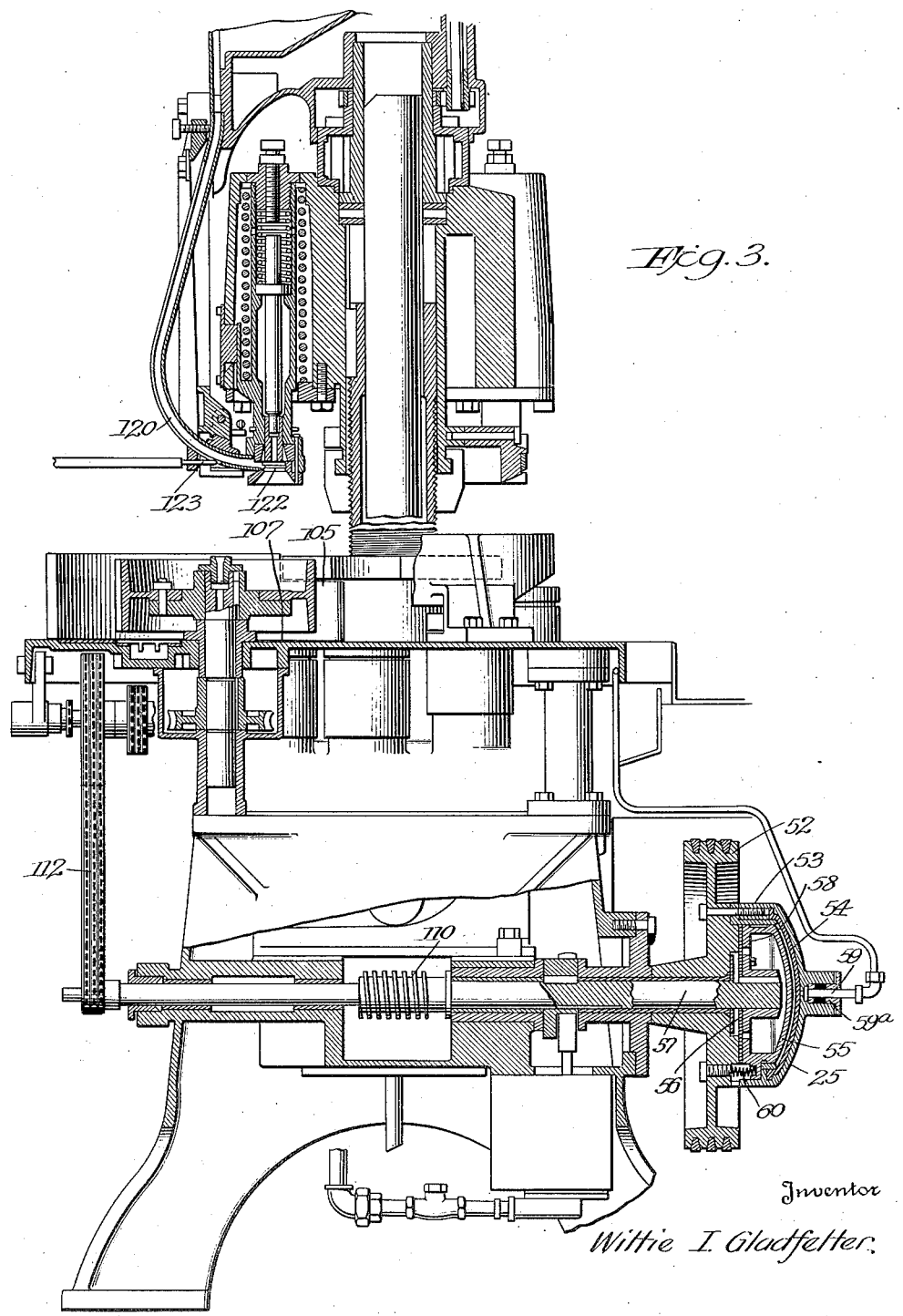
Figure 3 is a transverse view partly in elevation and partly in section, looking from the discharge end toward the in-feed end of the machine.

Figure 10 is a diagrammatic view of a preferred form of air control system, and illustrates the manner in which the clutch actuating air is conducted by suitable conduits from a source of air under pressure through the two control valves in series to the clutch. A conventional air compressor is indicated at A, and the air is conducted, under pressure, to a reservoir B. A pressure reducing regulator C and a pressure gauge D are interposed between the reservoir and the air control valve 30 located adjacent the discharge end of the machine. The air enters the valve casing through an axially bored orifice 80a below the valve 84a. When the valve is in open position as illustrated, air flows through a lateral port 86a, and through a conduit E to the aforementioned orifice 80 of the other control valve 24. When this valve is in open position, air flows outwardly through a lateral opening 86 and through a conduit F to the connection 59 of the clutch. A second conduit G is connected to a second lateral opening 86' of the casing 82 of valve assembly 24, and this conduit is connected to the air nozzle 123 associated with the crown feeding chute adjacent the capping head, as shown in Figure 3.

It will be apparent from a consideration of the arrangement of air conduits that air under pressure flows from the reservoir B first through the valve assembly 30, then through the valve assembly 24, and then to the clutch 25. If the valve 84a should be closed by any means, the supply of air from the reservoir would be immediately cut off, and the previously delivered air under pressure in the clutch would flow backwardly through the conduits F and E to exhaust through the opening 90a. On the other hand, if the valve 84a in the assembly 30 should remain open and the valve 84 of assembly 24 should be closed, the supply of air flowing to the clutch through the conduit E would be cut off at this point. Air under pressure in the clutch would then flow backwardly to be exhausted through the exhaust port 90 of that assembly. It should be noted that in the normal operation of the device, air under pressure flows, not only to the clutch, but also to the nozzle 123 adjacent the cap feeding chute 120, Figure 3, through the conduit G, Figure 10. When either valve 84 or 84a is closed, this flow of air is also stopped.

As stated above, both automatic and manual means are provided for controlling the action of the valves of the present invention. Referring to Figure 8, it will be seen that the spring-pressed latch bolt 64 extends through an opening 91 in a valve actuating shaft 92, which is formed with a reduced end 93 projecting into a socket 94 in the upper end of the valve stem 89. A compression spring is disposed in the socket 96 contacting with the bottom wall thereof and with the lower surface of the operating shaft 92.

The latch bolt 64 is provided with a recess 95 and a shoulder 96. When the parts are in operating position, the shoulder 96 engages the bottom surface of the opening 91 of the operating shaft and prevents upward movement of the valve stem. When the bolt 64 is moved to the left, either through the action of the pivoted guard 23 or by a manual pull applied to the handle 97 on the opposite end of the bolt, the shoulder 96 is moved out of contact with the shaft and the latter is permitted to snap upwardly under the action of the spring 83. The valve 84 is thus closed and the valve 87 opened to stop the machine, as previously described.

When it is desired to again start the machine, it is merely necessary to manually depress the actuating shaft 92 which through compensating spring 94a tightly closes valve 87 before the shoulder 96 of the bolt snaps back into latched position. When the shaft 92 has been sufficiently depressed, the bolt 64 will automatically assume latching position under the action of the spring 98.

A lost motion connection is provided between the cap 63 and the bolt 64 for the purpose of permitting an occasional extreme movement of the guard 23. Thus, if a large object becomes wedged between a projection on the spider 22 and the guard 23, the latter may be deflected a substantial distance from the normal position, and this swinging movement is permitted by sliding movement of the cap 63 and its sleeve on the head of the bolt 64 against the action of the springs 98, 99.

As stated at the outset of this specification, one of the objects of the invention is to design the various parts of the machine in such manner that the machine may be assembled for either right or left hand feed. The manner in which this object of the invention is accomplished will now be described.

It will be apparent that the main drive shaft 57 may be driven to rotate in either direction, and as a consequence, the several bottle handling spiders will rotate in either one of two directions, and the endless conveyor 20 will move in a corresponding direction.

The problem then of converting the machine from a left-hand feed resides in moving the bottle infeed timing mechanism shown at one end of the machine of Figure 1 to the other end thereof, and in correspondingly transposing the infeed and outfeed guards, valve, and safety devices. In order to permit this transposition of parts, each of the elements is formed so that the portions on opposite sides of a horizontal bisecting plane are similar. The bracket 34 which supports the bottle arresting gate and associated parts is formed with a vertical web and two laterally projecting horizontal flanges. Each flange is similar to the other and either one may serve as the base for the bracket, depending upon whether it is to be mounted adjacent the left end or the right end of the machine. Likewise, the gate member 31 is formed with similar halves above and below a horizontal bisecting plane. Consequently, these parts may be turned over and used at either end of the machine. Particular attention is called to the fact that two sets of lugs 48 and 48a are formed on the gate member for the purpose of receiving the pivoted dog 47.

The bracket 60a to which the guard 23 is pivotally secured is also formed with upper and lower horizontal flanges, either of which may serve as a base. The member 23 itself is similar both above and below a horizontal axial plane.

All of the parts adjacent the discharge end of the machine shown in Figure 1 are similarly formed, so that they may be inverted and used at the other end of the machine of that figure, if the feed is to be reversed in direction. Similarly, the infeed and outfeed spiders may be turned over, so that the pockets formed therein will cooperate with bottles moving in either direction.

It should be noted that all of the parts which are affected by the direction of movement of bottles through the machine are double based, so that they may be assembled in two operative positions, depending upon the direction of feed of the machine.

The power driving system of the present machine will now be described. As stated above, power from a suitable prime mover is applied through the air clutch 25 to the main driving shaft 57 of the machine. This shaft is provided with a worm 110 meshing with a worm ring 111 secured to the central capping head post 106 to rotate the capping head, bottle rests, and associated parts.

Power is transmitted from the opposite end of the shaft 57 by a sprocket chain 112 to a short countershaft 113. The latter is provided with a second sprocket 114 about which is trained a sprocket chain adapted to deliver power to a second countershaft 115. Each countershaft has a driving worm 116 secured adjacent its end which drives a corresponding worm 117 on each spider shaft 40. The first mentioned countershaft 113 may well be provided with an additional sprocket 118 which drives a chain 119 adapted to impart movement to the endless conveyor 20.

Certain features of the invention relating to the capping turret and the bottle rests associated therewith, and other features relating to the cap feeding device are more fully disclosed and claimed in my divisional application filed January 23, 1935, Serial No. 3,176.

From a consideration of the above description, it will be seen that I have provided a machine which accomplishes the several stated objects of the invention.

I claim:

1. In a machine of the class described, means for conveying bottles, a bottle receiving spider secured to a rotatable shaft adjacent the inlet end of said machine, and means for controlling the transfer of bottles from said conveying means to said spider, said controlling means comprising an oscillatable bottle arresting member having a single end normally overlying said conveying means and arranged to be deflected from bottle arresting position by contact with bottles moving on said conveying means, movable abutment means positioned in the path of oscillation of said arresting member for preventing deflection thereof except when said bottle receiving spider is in position to properly receive each said bottle, and a connection between said abutment means and said member constructed and arranged to permit initiation of oscillation of said member upon movement of said abutment means and to permit completion of oscillation and the return to arresting position of said arresting member independently of the position and movement of said abutment means.

2. In a machine of the class described, means for conveying bottles, a bottle receiving member associated with said machine, and means for controlling the transfer of bottles from said conveying means to said receiving member, said controlling means comprising an oscillatable pivoted gate having an end adapted normally to project over said conveying means into bottle arresting position, said gate being mounted to be swung from bottle arresting position by contact with bottles moving on said conveying means, a movable abutment normally projected into the path of swing of said gate to prevent initiation of swinging movement thereof from bottle arresting position except when said bottle receiving member is in proper position to receive a bottle, means for momentarily withdrawing said abutment to permit initiation of swinging movement of said gate by a bottle when said receiving member is in such position, and a connection between said abutment and gate permitting completion of said swinging movement for the passage of a bottle thereby and permitting subsequent return of said gate to bottle arresting position independently of the position of said abutment.

3. In a machine of the class described, means for conveying bottles, a bottle receiving member associated with said machine, and means for controlling the transfer of bottles from said conveying means to said receiving member, said controlling means comprising an oscillatable gate pivoted adjacent its rear end on a vertical axis and having its forward end normally projecting over said conveying means into bottle arresting position, said forward end of said gate being mounted to be swung horizontally from bottle arresting position by contact with a bottle on said conveying means and then to be swung back to such arresting position by spring tension after passage of each bottle, a reciprocating abutment plunger normally projected into the path of swing of said gate to prevent swinging movement thereof from bottle arresting position except when said bottle receiving member is in proper position to receive each said bottle, means for withdrawing said plunger to permit swinging movement of said gate when said receiving member is in such position, and a one way connection between said gate and plunger adapted to permit the return of said gate to bottle arresting position independently of the position of said plunger.

4. In a machine of the class described, means for conveying bottles, a bottle receiving spider secured to a vertically disposed rotatable shaft adjacent the inlet end of said machine, and means for controlling the transfer of bottles from said conveying means to said receiving spider, said controlling means comprising a gate pivoted on a vertical axis and having an end normally projecting over said conveying means into bottle arresting position, said gate being mounted to be swung horizontally from bottle arresting position by contact with bottles on said conveying means, a vertically reciprocating plunger adapted to be projected into the path of swing of said gate to prevent swinging movement thereof from bottle arresting position, means for controlling reciprocation of said plunger, and a one way connection between said gate and plunger, said means for controlling reciprocation of said plunger comprising a cam secured to said vertically disposed rotatable shaft, a horizontally movable cam follower associated therewith, and a bell crank lever disposed between said horizontally movable cam follower and said vertically reciprocating plunger, whereby said plunger is retracted from the path of swing of said gate by said cam when said spider carried by said vertically disposed rotatable shaft is in proper position to receive each said bottle, said one way connection permitting the return of said gate to bottle arresting position independently of the position of said plunger.

5. Means for controlling the delivery of bottles from a conveyor to the infeed spider of a capping machine, said means comprising a bracket adjacent said conveyor, an oscillatable gate pivoted on said bracket and having its free end normally projecting over said conveyor in bottle arresting position, said end of said gate being deflectable from arresting position by contact with a bottle moving on said conveyor, means for preventing such deflection comprising a reciprocating plunger movable into and out of the path of oscillation of the gate in timed relation to said spider, and a movable detent connection between said gate and plunger to permit free movement of the latter irrespective of the position of the former.

6. Means for controlling the delivery of bottles from a conveyor to the infeed spider of a capping machine, said means comprising a bracket adjacent said conveyor, an oscillatable gate pivoted on said bracket and having its free end normally projecting over said conveyor in bottle arresting position, said end of said gate being deflectable from arresting position by contact with a bottle moving on said conveyor, means for preventing such deflection comprising a reciprocating plunger movable into and out of the path of oscillation of the gate in timed relation to said spider and a movable detent connection between said gate and plunger to permit free movement of the plunger irrespective of the position of the gate, and free return of the gate to bottle arresting position irrespective of the position of the plunger.

7. In a machine of the class described, a supporting table, a conveyor associated with said table, a bottle receiving member adjacent the inlet end of said machine, and means for controlling the transfer of bottles from said conveying means to said member, said controlling means comprising a gate member pivoted on a vertical axis and having an end normally projecting over said conveyor into bottle arresting position, said gate member being mounted to be deflected and swung from bottle arresting position by contact with each said bottle on said conveyor, and a vertically reciprocating abutment plunger projecting upwardly from said table, said gate member carrying a pivoted dog in position to abut said plunger when the latter is projected upwardly to prevent swinging deflection of said gate member, the pivotal mounting of said dog serving to permit the upwardly projecting movement of said plunger when said gate member is in deflected position, whereby said gate member after being deflected by a bottle on said conveyor will remain in deflected position until said bottle has passed thereby, irrespective of the position of said plunger.

8. The combination with a machine of the class described including bottle conveying means, of power control means for said machine, said last mentioned means comprising an air pressure actuated friction clutch, a source of air under pressure, a single air line leading from said source to said clutch, at least two valves disposed in series in said line, each constructed and arranged to terminate the flow of air to said clutch and to relieve the clutch actuating air pressure to stop the machine, and at least two independent means associated with said bottle conveying means at spaced points along the length thereof and each disposed to be actuated by an abnormally positioned bottle on said conveying means adjacent thereto to operate one of said valves to release said clutch and stop the machine.

9. A machine of the class described comprising bottle conveying means and power transmission means including an air pressure actuated friction clutch and a single air pressure line leading thereto, in combination with control means for said clutch, said means comprising a plurality of valves in series in said line disposed to control the flow of air to and from said clutch to start and stop said machine, respectively, manual means for operating said valves, independently, and independent automatic valve operating means associated with said bottle conveying means at spaced points along the length thereof, said automatic operating means each being adapted to be actuated by an abnormally positioned bottle on said conveying means to operate one of said valves to stop the machine.

10. A machine of the class described comprising bottle conveying means, an infeed spider, an outfeed spider, and power transmission means including an air pressure actuated friction clutch, in combination with control means for said clutch, said means comprising a plurality of valves in series in the air line to said clutch disposed to control the flow of air to and from said clutch to start and stop said machine, respectively, and automatic valve operating means comprising two arcuate guards spaced from said infeed and outfeed spiders and adapted to be displaced by an improperly positioned bottle in either spider, the displacement of either of said guards serving to operate one of said valves to stop the machine.

11. A machine of the class described comprising bottle conveying means and power transmission means including an air pressure actuated friction clutch in combination with control means for said clutch, said means comprising a plurality of valve mechanisms disposed in the air line leading to said clutch and each adapted to assume two positions to either operate or stop the machine, a spring pressed latch arranged to hold each of said valve mechanisms in operating position, manual means for actuating each of said valve mechanisms to either of said two positions, and automatic means to spring said latches to permit said valve mechanisms to move to stop position, said automatic means comprising a plurality of spaced members associated with said bottle conveying means and adapted to be operated by an improperly positioned bottle on said conveying means to stop the machine.

12. A timing device for controlling the transfer of bottles from a conveyor to a bottle handling machine, said device comprising an oscillatable bottle arresting member normally projecting over said conveyor and adapted to be deflected by bottles thereon to permit transfer of the same to the machine, an abutment operable to control the deflection of said member by said bottle, and means permitting the return of said member from deflected position to the position projecting over said conveyor independently of the position of said abutment.

13. A timing device for controlling the transfer of bottles from a conveyor to a bottle holding machine, said device comprising an oscillatable bottle arresting member normally projecting over said conveyor and adapted to be deflected by bottles thereon to permit transfer of the same to the machine, an abutment operable to prevent deflection of said member, but being movable to permit deflection thereof by bottles positioned on said conveyor in properly timed relation to said machine, and a connection between said member and said abutment permitting the return of said member from deflected position independently of the position of said abutment.

WILTIE I. GLADFELTER.